United States Patent [19]

Davis et al.

[11] 4,278,227
[45] Jul. 14, 1981

[54] VEHICLE REAR-VIEW MIRRORS

[75] Inventors: Kenneth P. Davis, Harlington; Charles A. Boughtflower, Bourne End, both of England

[73] Assignee: Magnatex Limited, Middlesex, England

[21] Appl. No.: 930,311

[22] Filed: Aug. 2, 1978

[30] Foreign Application Priority Data

Sep. 20, 1977 [GB] United Kingdom ............... 39037/77

[51] Int. Cl.³ .............................................. B60R 1/02
[52] U.S. Cl. ................................ 248/487; 248/475 B; 74/18.1; 74/501 M; 403/51
[58] Field of Search .................. 74/18.1, 18.2, 501 M; 403/50, 51, 149, 263; 248/475 B, 478, 487, 479, 481, 549

[56] References Cited

U.S. PATENT DOCUMENTS

| 1,482,286 | 1/1924 | Colley | 403/149 |
| 3,339,877 | 9/1967 | Valenzuela | 248/481 |
| 3,508,815 | 4/1970 | Scheitlin et al. | 248/481 X |
| 3,544,259 | 12/1970 | Fujita | 248/549 |
| 3,703,270 | 11/1972 | Tomlin | 248/549 |
| 3,828,623 | 8/1974 | Zillner | 248/475 B X |
| 4,011,769 | 3/1977 | Davis | 248/479 X |

FOREIGN PATENT DOCUMENTS

| 516993 | 9/1955 | Canada | 52/110 |
| 2627749 | 12/1976 | Fed. Rep. of Germany | 248/549 |
| 2802502 | 7/1978 | Fed. Rep. of Germany | |
| 1193935 | 8/1978 | United Kingdom | 403/50 |

Primary Examiner—William H. Schultz
Attorney, Agent, or Firm—Biebel, French & Nauman

[57] ABSTRACT

An improved vehicle rear-view mirror assembly of the type in which the mirror support arm is carried by means of at least one movable joint from the mounting part of the mirror assembly which is adapted to be secured to the bodywork of the vehicle includes a shroud of a resilient and flexible material mounted on the back of the mirror, and an extension having at least one movable joint with the end region of the extension in sealing relation with the mounting part, the extension enshrouded by a bellows-like tubular gaiter of flexible material. The shroud and the extension reduce the risk of injury to a person who may be accidentally hit by, or hit, the mirror assembly and the bellows-like gaiter also protects the movable joint or joints from dirt and moisture while readily flexing to allow the joint or joints to move or to be adjusted.

8 Claims, 7 Drawing Figures

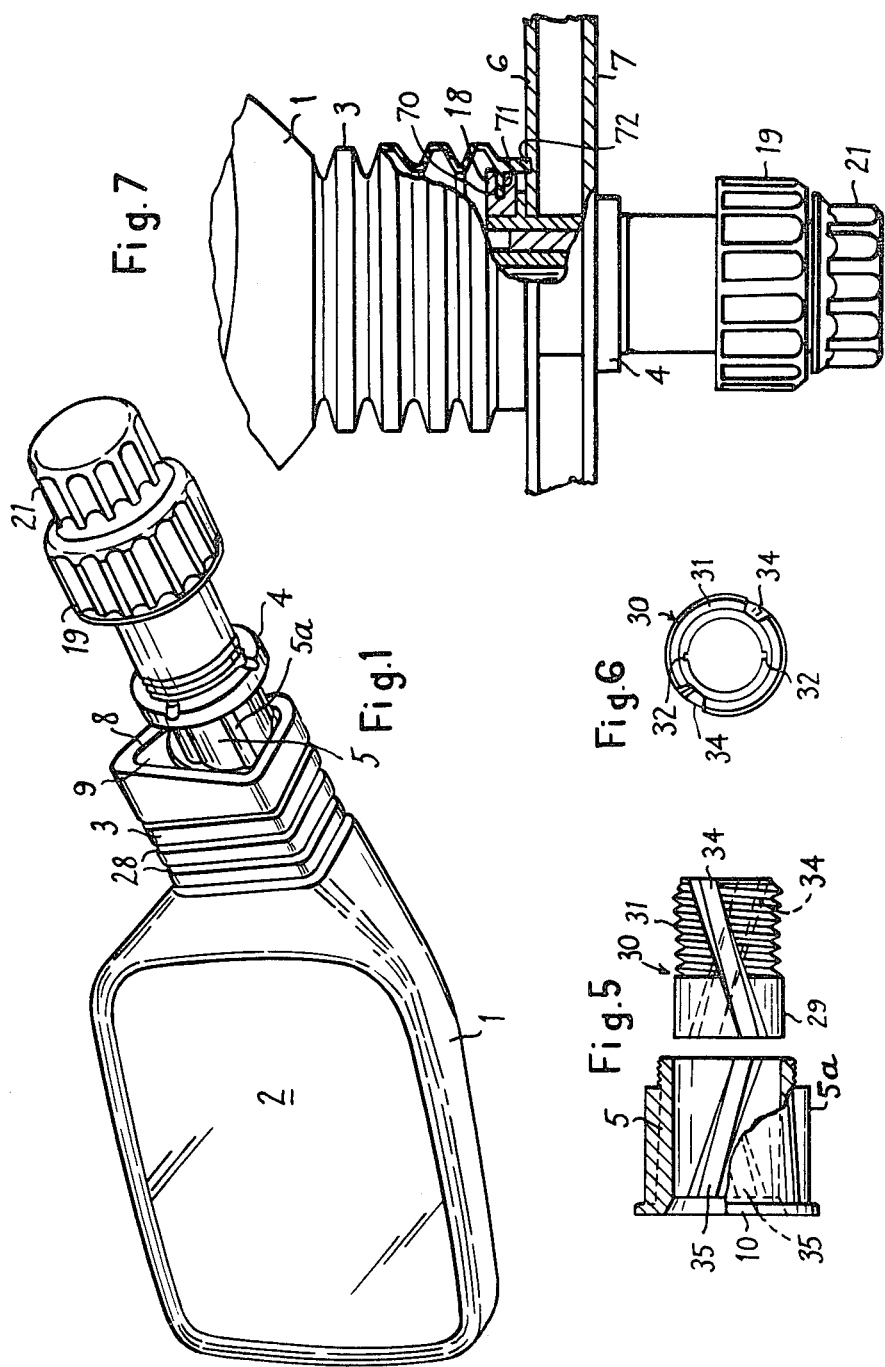

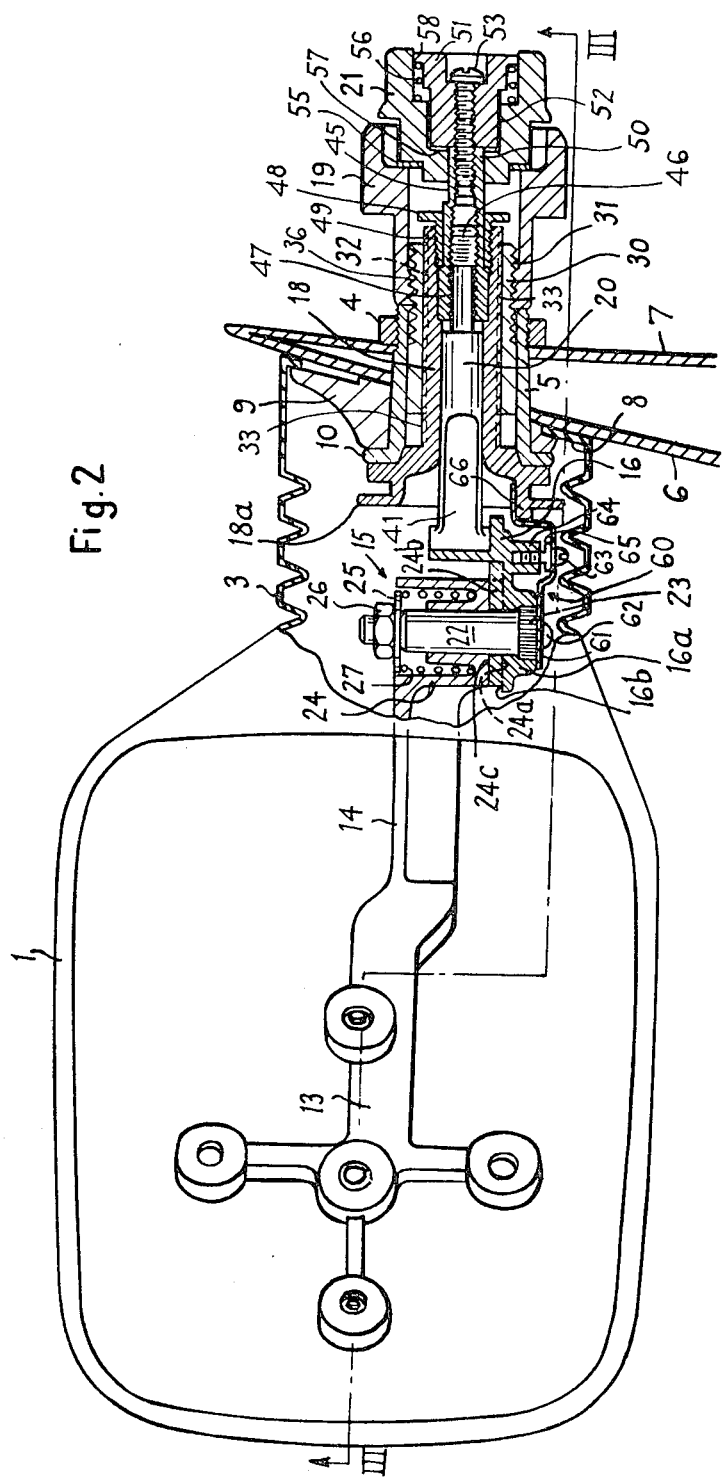

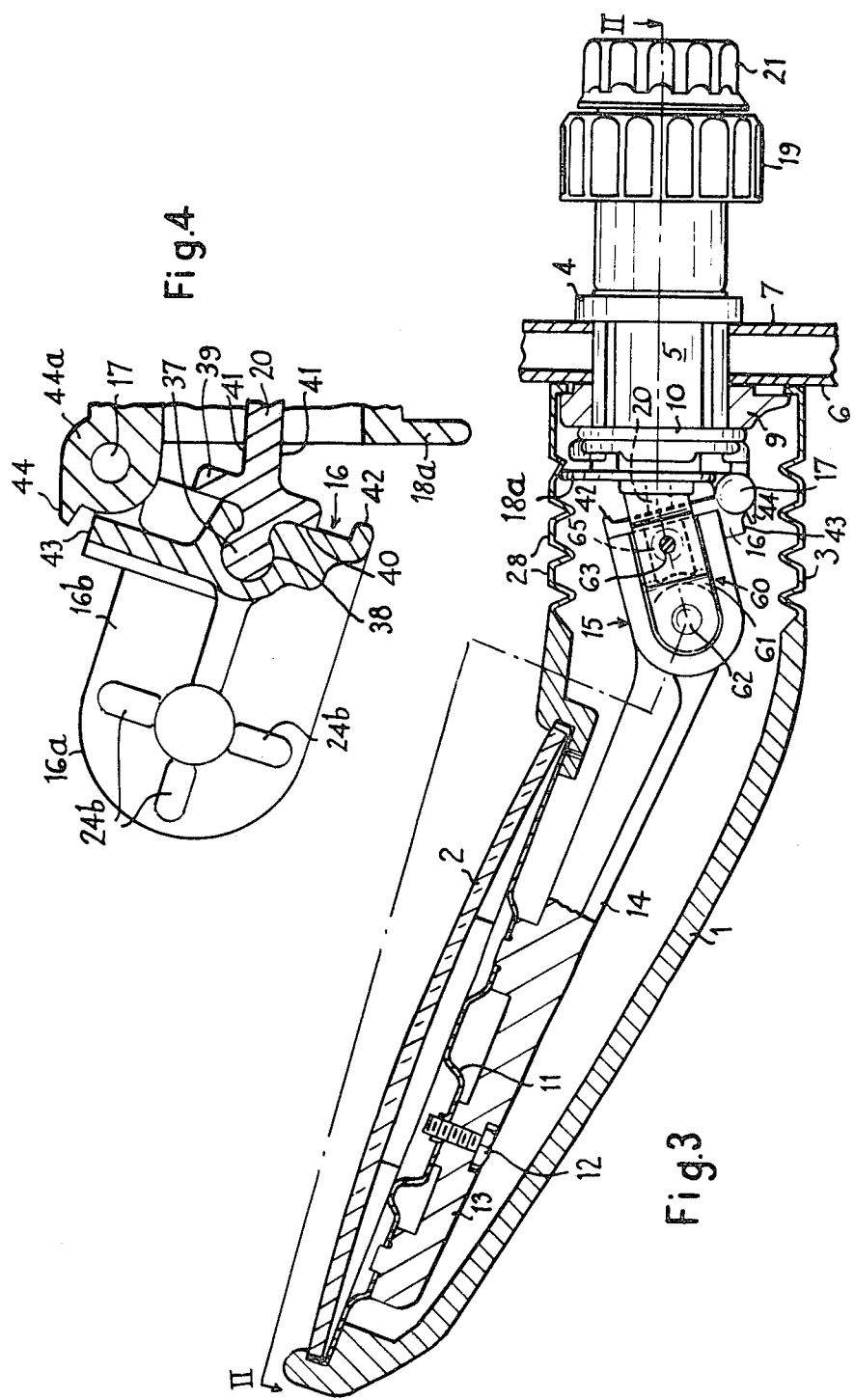

VEHICLE REAR-VIEW MIRRORS

This invention relates to a vehicle rear-view mirror assembly of the kind in which the mirror support arm is carried by means of at least one movable joint from the mounting part of the mirror assembly which is adapted to be secured to the bodywork of the vehicle. More particularly, but not exclusively, the invention relates to a mirror assembly of the kind referred to which is intended to be secured externally of the vehicle body on or adjacent the vehicle door or within the framing in which the glass panel of a front door window or quarter light is fitted (so-called "door mirror").

The invention consists in a mirror assembly of the kind referred to, wherein the back of the mirror is covered by a shroud of a resilient and flexible material provided with an extension comprising a tubular gaiter of flexible material of bellows-like construction which surrounds the at least one movable joint with the end region of said extension in sealing relation with the mounting part, or with the vehicle body when the mirror assembly is mounted thereon. By means of the construction according to the invention, not only do the shroud and the extension reduce the risk of injury to a person who may be accidentally hit by, or hit, the mirror assembly, but the bellows-like gaiter also protects the movable joint or joints from dirt and moisture while readily flexing to allow the joint or joints to move or to be adjusted.

The shroud and the extension gaiter may be moulded in polyurethane foam material. They may be moulded integrally or may comprise separate parts which may be assembled together, for example with the use of adhesive or heat welding.

In a preferred embodiment of door mirror according to the invention, the mirror arm is carried from the mounting part by two pivotable joints with parallel pivot axes (which are substantially vertical when the mirror is in use), one of which is adjustable by remote control from inside the vehicle body to select the position of the mirror support arm, and thus of the mirror, for correct rear viewing, and the other of which releases when a force exceeding a predetermined value is applied to the shroud, and thus to the mirror support arm, to permit the mirror arm to move under impact or if it be desired to turn the mirror against the vehicle body during washing the vehicle in an automatic car wash. The releasing joint may be provided with one or more indexing positions to facilitate setting the arm in relation to the part of the adjustable joint which carries the releasing joint. The bellows-like gaiter is particularly advantageous in facilitating turning the mirror arm, up to approximately 90°, about the releasing joint.

In order that the invention may be more clearly understood, reference will now be made to the accompanying drawings, in which:

FIG. 1 is a perspective view of one embodiment of a vehicle rear-view door mirror assembly according to the invention, FIG. 2 is a front view, partly in section, of the mirror assembly shown in FIG. 1 with the mirror glass removed, the section being taken along the line II—II of FIG. 3, FIG. 3 is a section along the line III—III of FIG. 2, FIG. 4 is a fragmentary view partly in section at 180° to the section of FIG. 3, and to an enlarged scale, FIG. 5 is an exploded view of two of the parts of the mirror assembly of FIG. 1, FIG. 6 is an end view of one of the parts of FIG. 5, and FIG. 7 is a fragmentary view of a modification, shown partly in section.

The door mirror shown in FIGS. 1-4 comprises a shroud 1, moulded of polyurethane foam material, into which the mirror glass 2 is fitted, the shroud having a gaiter portion 3 which abuts the outer skin 6 of the vehicle door when the mirror is secured thereto by means of a threaded ring 4 which screws on to the threaded end of a tubular mounting member 5 which passes through apertures in and bridges the outer and inner skins 6, 7 respectively of the vehicle door. The mirror assembly is conveniently mounted on a triangular part having inner and outer skins 6, 7 and secured to the vehicle body work within the framing in which the glass panel of the door window is fitted, the triangular part being located where the front quarter light would have been. The outer skin 7 of the triangular part may be a separate plate known as a cheeter plate which is secured to the inner skin when mounting the assembly. The free end of the gaiter 3 is formed with an inwardly extending flange 8 which is clamped between the outer skin 6 and an adapter piece 9, which is shaped to conform with the curvature of the outer skin 6 and abuts the flange 10 on the outer end of the sleeve 5, when the ring 4 is tightened.

To prevent rotation of the mounting member 5 with respect to the door, it may be provided with external ribs 5a which cooperate with corresponding notches in the apertures in the skins 6, 7.

The mirror glass 2 is equipped with a backing member 11 which is secured by a screw 12 to the centre of a spider portion 13 at the end of the mirror arm 14. The ends of the arms of the spider portion 13 support the back of the backing member 11 to resist vibration of the glass. The mirror arm 14 is connected by a releasable pivotable joint, generally indicated at 15, to a mirror support member 16 having a mounting plate which is hinged by a pivot (pivotable joint) 17 to the head 18a of a tubular mounting part 18, which may be a metal die casting, having a flange bearing against the flange 10 and mounted for rotation within the mounting member 5 by mechanism under control of an operating knob 19, conveniently of plastics material. The inclination of the mirror support member 16 relative to the head 18a is effected by a flexible push rod 20 interlocked with the mounting plate and under control of a second operating knob 21, conveniently of plastics material. The mechanism by which the knobs 19 and 21 adjust the position of the mirror 2 is described later.

The releasing joint 15 comprises a spindle 22 having a knurled head 23 by which it is keyed in a recess in a wall part 16a of the member 16, which wall part extends in a direction away from the member 5, the face 16b of which abuts the face 24a of a bearing boss 24 at the end of the mirror arm 14. The spindle 22 passes through a bore in the boss 24 and is provided at its end with a washer 25, held in place by a nut 26 threaded on to the end of the spindle 22, to retain a spring 27 located in a cylindrical recess in the boss 24 under compression. The opposing faces 16b, 24a which are urged together by the spring 27 are provided with one or a plurality of complementary grooves and ridges, serrations or the like providing one or more locating or indexing positions in which the mirror arm 14 can be releasably held by the spring 27. Conveniently there may be three indexing positions at approximately 90° spacing and defined by ridges 24b (FIG. 4) on the face 16b engaging complementary grooves 24c in the face 24a of the boss, the central position defining the normal position of the mirror arm for rear-viewing. By exerting a force on the front of the mirror 2 or the back of the shroud 1, the arm 14 can be pivoted about the releasing joint 15 in either one direction or the other.

The mechanism by which the operating knob 19 turns the tubular member 18 about a horizontal axis comprises a screw-thread reduction drive whereby the tubular member is held against accidental rotation. The screw-thread reduction drive which comprises a sleeve 30, conveniently of plastics material having an outer surface provided with a smooth portion 29 and a screw thread 31 is axially slideable on the outer surface of the tubular member 18 within the space between the tubular member 18 and the mounting member 5. The sleeve is provided in its inner surface with two diametrically opposed keyways 32 slideable on two axially extending keys 33 on the outer surface of the tubular member 18, and the outer surface of the sleeve is formed with two grooves 34 of opposite hand which extend across the smooth portion 29 and the screw thread 31 and are inclined at an acute angle, preferably as shown in FIG. 5 with a helical curvature, to the axial direction of the tubular member 18, said grooves 34 co-operating respectively with complementary projecting keys 35 on the internal surface of the mounting member 5. Thus the sleeve constitutes a key member which, as it moves axially of the tubular member 18, is caused by the coaction between the guide means defined by the inclined grooves 34 and keys 35 to turn relative to the mounting member 5 and thereby, through the keys 32 and keyways 33, to turn the tubular member 18 about its axis. Both the cooperating grooves and keys have bevelled sides as shown to faciliate movement of the sleeve. The amount of rotation of the tubular member 18 is limited by the inclination of the keys 32 and keyways 33, conveniently to about 35°. Alternatively, one of the two diametrically opposed pairs of grooves 34 and keys 35 may be omitted.

Axial movement of the sleeve 30 is effected by means of the operating knob 19 which has an internal screw thread 36 cooperating with the external screw thread 31 on the sleeve 30.

The rod 20, which is made at least in part, and preferably entirely of a flexible plastics material, is axially movable in the passage through the tubular member 18 by rotating the second operating knob 21 and is connected at its outer end 37 to the mirror support member 16 by the end being formed as a ridge 37 having a rounded head portion merging into a neck portion and fitted in a complementary socket 38 in the mirror support member 16. The outer end of the rod is made rigid with the mirror support member 16 by means of a flange 39 projecting from opposite sides respectively of the rod 20 adjacent the neck portion and engaging against the flat surface 40 on the inner end of the support member 16. A portion of the rod 20 is made of reduced cross-section, or provided with diametrically opposed flats, as shown at 41 to provide sufficient flexibility to enable the mirror support member 18 to be hinged about the pivot 17 as the rod 20 is moved axially. The pivot 17 comprises a hinge pin which extends transversely to the axis of the passage through the tubular member 18 and the rod 20 and to one side of said axis and rod. By moving the rod 20 axially, by rotating the knob 19, the mirror support member 16 can be turned around the pivot 17 from an inner position in which the mirror support member lies close against the head 18a to an outer position in which the mirror support member is inclined away from the head 18a. Rotation of the rod 20 due to rotation of the knob 21 is prevented by the engagement of the ridge 37 in the socket 38. The amount of turning about the pivot 17 is limited, conveniently to about 20°, by a stop 42 on the mirror support member engaging the head 18a in the inner position and by the engagement of a stop 43 on the mirror support member with a stop 44 on the pivot base part 44a on the head 18a in the outer position.

Axial movement of the rod 20 is effected by an elongate tubular nut member 45 which extends into the passage in the tubular member 18 and is screwed on to the screw-threaded inner end portion 46 of the rod 20. The nut member 45 is held captive with the tubular member 18 by providing its end with an enlarged collar portion 47 which is held between a shoulder in said passage and an externally threaded bush 48 screwed into an internal thread 49 at the inner end of the passage. Thus, the nut member 45 is restrained against axial movement relative to the tubular member 18 while rotatable therein. The free inner end of the nut member 45 projects through an axial bore 50 on the inside 57 of the second operating knob 21 and abuts a plug 51 fitted in an external recess 52 in the knob 21, the nut member being secured to the knob by means of a screw 53 which passes through the plug 51 and is threaded into the end of the nut member 45. Screw 53 is adjusted so that a shoulder on the knob 21, bears, through the intermediary of a washer 55, against the knob 19 to hold its other end against the inner end of the mounting member 5 which inner end of the mounting member forms a thrust bearing for the knob 19. A compression spring 56 is housed in a widened portion of the recess 52 in the knob 21 between a shoulder in the recess and a flange 58 of the plug 51 to take up any play between the two knobs.

By adjusting the knobs 19 and 21, the mirror support member 16 and thus the mirror can be tilted about the generally horizontal axis of the mounting member 5 and the generally vertical axis of the pivot 17 respectively to adjust the orientation of the mirror in both vertical and horizontal planes for correct rear-viewing.

Rotation of the knob 19 produces axial movement of the key member 30 through the screw-thread drive, the key member cooperating with the guide means 32, 33 extending axially and the guide means 34,35 inclined at an acute angle to the direction of axial movement to cause the tubular member 18 to turn about its axis as the key member 30 is moved axially. A fine adjustment of the angular position of the tubular member 18 is therefore achieved and also the screw action of the cooperating threads on the key member 30 and the control knob 19 hold the key member in its adjusted axial position and, through the cooperating keys and key-ways 32, 33, 34 and 35, the tubular member 18 is prevented from turning.

To permit these adjusting movements and also displacement of the mirror about the releasing joint 15, the gaiter 3 which surrounds the movable joints is moulded of polyurethane foam with a thinner cross section than the part of the shroud which encloses the back of the mirror and is furthermore provided with a series of corrugations 28 to provide adequate extension and flexing of the gaiter to permit the required movements.

In order to guard against untoward vibration of the mirror support member 16, preferably a vibration dampening device 60 is provided between the mirror support member and the tubular member 18. The dampening device 60 comprises a spring metal pressure plate 61 bridging the gap between the part 16a of the mirror support member and the head 18a and secured by an outer flat end portion to the part 16a by a screw 62 secured in a bore in the spindle 22. The flat end portion merges into a stepped portion having an aperture therein through which projects with the clearance the head of an adjusting screw 63 screwed into the internally threaded bore of a projection 64 on the part 16a, the screw having a circular flange 65 intermediate its ends which engages with the inner surface of the stepped portion. Extending at approximately 90° to the stepped portion is the inner end portion of the pressure plate, which end portion projects underneath a restraining ridge 66 on the head 18a and into a flat-sided locating and restraining recess in the passage through the tubular member 18. By unscrewing the adjusting screw 63 tension is imparted to the pressure plate through the flange 65 which presses the joint part on the head 18a and joint base part 44a axially together to damp any untoward vibration which may otherwise be transmitted through the pivot 17 to the mirror supporting arm and thus to the mirror under some conditions or in certain instances. Alternatively, the pressure plate 61 could be arranged to act in compression for example by arranging its inner end to abut the outer surface of the ridge 66 and the screw flange 65 to engage the outer surface of the pressure plate.

FIG. 7 shows a fragmentary view of a modification in which the gaiter portion 3 of the shroud is of generally cylindrical cross-section, instead of approximately triangular cross-section as in the previous embodiment. It is retained in position at its free end by an inwardly extending flange 70 extending into a groove 71 around the head 18a and has a skirt portion 72 which bears against the outer surface of the outer skin 6. Preferably the skirt portion 72 is of such length that it is slightly compressed when the mirror assembly is screwed in position on the vehicle door.

While a particular embodiment has been described, it will be understood that various modifications may be made without departing from the spirit of the invention. For example the mirror may be carried from the mounting part by only a single movable joint, such as a releasing joint or a joint for adjusting for correct rear-viewing, whether adjustable from inside the vehicle or not.

We claim:

1. A vehicle rear view mirror assembly comprising in combination:
   (a) a mirror having a backing member,
   (b) a protective mirror shroud of a resilient and flexible material comprising,
      (i) a rim portion in which the mirror is fitted,
      (ii) a body portion which extends from the rim portion with which it is integral and covers the back of the mirror, said body portion having an outer surface which extends continuously over the mirror backing member, and
      (iii) a part which projects beyond the mirror edge and defines an opening therein,
   (c) a tubular extension gaiter of flexible material of bellows-like construction which is continuous with the said part of said shroud and which has a free end,
   (d) a mirror support arm assembly, and
   (e) a mounting part carrying the mirror support arm assembly and adapted to be secured to the bodywork of the vehicle,
   (f) said mirror support arm assembly extending through the opening in the said part of said shroud and through said extension gaiter and comprising
      (i) a mirror support arm which is fixed at its end region to the backing member inside the shroud, and
      (ii) at least one movable joint connecting said mirror support arm to said mounting part,
   (g) said gaiter extension having at its free end an inwardly extending flange which is adapted to be clamped between the outer surface of the vehicle bodywork and the mounting part and which is in sealing relation with at least one of the mounting part and the vehicle bodywork when the mirror assembly is mounted thereon,
   (h) the material of the gaiter extension having a thinner cross-section than that of the rim and body portions of said shroud, and
   (i) said rim and body portions of said shroud having a predetermined rigidity which enables both said rim and body portions to move together with the mirror when the mirror support arm moves about said at least one movable joint yet permits the material of said shroud to yield resiliently when hitting, and being hit by, an object.

2. A mirror assembly as claimed in claim 1, wherein the shroud and extension gaiter are moulded integrally with each other.

3. A mirror assembly as claimed in claim 1, wherein the shroud and extension gaiter are moulded in polyurethane foam material.

4. A mirror assembly as claimed in claim 1, wherein the mirror support arm is carried from the mounting part by two pivotable joints surrounded by the extension gaiter and having parallel pivot axes, one of said pivotable joints being adjustable from inside the vehicle to adjust the position of the mirror support arm and the other of said pivotable joints releasing when a force exceeding a predetermined value is applied to the shroud, and thus to the mirror support arm, to permit the mirror to move under impact or if it is desired to turn the mirror against the vehicle during washing the vehicle in an automatic car wash.

5. A mirror assembly as claimed in claim 4, wherein the mounting part is of tubular form and is located partially within a tubular mounting member which has inner and outer ends and which is adapted to be non-rotatably secured through an opening in the vehicle body work with the outer and inner ends of the tubular mounting member respectively outside and within the vehicle, the tubular mounting part having an axis which extends transversely to the axes of the two pivotable joints, wherein the adjustable pivotable joint has two parts which are carried respectively by a mirror support member to which the mirror arm is connected by means of the releasing pivotable joint and the tubular mounting part, wherein a rod of a flexible plastics material extends through the tubular mounting part and has its outer end rigid with the mirror support member, the rod being axially movable from inside the vehicle to adjust the position of the mirror support member about the axis of the adjustable pivotable joint, and wherein spring means are provided for pressing the two parts of the adjustable pivotable joint together axially to damp vibration of the mirror support member and yet still permit adjustment of the adjustable pivotable joint about its said axis.

6. A mirror assembly as claimed in claim 5, wherein the spring means comprises a spring plate which extends between the mirror support member and the tubular mounting part and which has its outer end fixed to the mirror support member and its inner end restrained against the tubular mounting part, the spring plate comprising a stepped portion intermediate its ends, and screw-threaded means is provided for adjusting the pressure exerted by the spring plate on the joint parts, the stepped portion having means defining an aperture therein and the mirror support member having means defining a screw-threaded bore therein, said screw-threaded means extending through said aperture and into said screw-threaded bore.

7. A mirror assembly as claimed in claim 5, wherein the releasing pivotable joint is provided with at least one indexing position to facilitate setting of the mirror support arm, the outer end of the rod is connected to the mirror support member by means of a ridge on the rod engaging in a rigid complementary socket in the mirror support member, and a transverse flange on the rod adjacent the ridge engages with the mirror support member whereby the outer end of the rod is made rigid with the mirror support member, and wherein the tubular mounting part is turnable about its axis from inside the vehicle by means of a screw-thread reduction drive to adjust the position of the mirror support arm about the axis of the tubular mounting part.

8. A mirror assembly as claimed in claim 1, including an outwardly extending flange on said mounting part and spaced from the outer surface of the vehicle bodywork, an adaptor piece shaped to conform to the outer surface of the vehicle bodywork and located between and abutting against said outwardly extending flange, said inwardly extending flange of said gaiter extension extending between said adaptor piece and the outer surface of the vehicle bodywork, and means for clamping said inwardly extending flange between said adaptor piece and the vehicle bodywork.

* * * * *